US008825528B1

(12) United States Patent
Bauermeister et al.

(10) Patent No.: US 8,825,528 B1
(45) Date of Patent: Sep. 2, 2014

(54) ONLINE ADVERTISEMENT PROVISIONING

(75) Inventors: Benjamin P. Bauermeister, Seattle, WA (US); Johan F. Habermann, Lake Forest, WA (US)

(73) Assignee: Adobe Systems Incorporated, San Jose, CA (US)

( * ) Notice: Subject to any disclaimer, the term of this patent is extended or adjusted under 35 U.S.C. 154(b) by 906 days.

(21) Appl. No.: 12/545,538

(22) Filed: Aug. 21, 2009

(51) Int. Cl.
*G06Q 30/00* (2012.01)
*G06F 17/30* (2006.01)

(52) U.S. Cl.
USPC 705/14.55; 705/14.4; 705/14.6; 707/E17.009; 707/E17.107

(58) Field of Classification Search
USPC ............. 705/14.55, 14.4, 14.6; 707/E17.009, 707/E17.107
See application file for complete search history.

(56) References Cited

U.S. PATENT DOCUMENTS

2005/0119936 A1* 6/2005 Buchanan et al. ............... 705/14
2006/0294538 A1* 12/2006 Li et al. ............................ 725/24

FOREIGN PATENT DOCUMENTS

WO    WO 03034300 A2 * 4/2003 ............. G06F 17/60

* cited by examiner

*Primary Examiner* — John Van Bramer
(74) *Attorney, Agent, or Firm* — Kilpatrick Townsend & Stockton LLP

(57) ABSTRACT

An online ad provisioning system couples persuasive media items (ads) with an established viewership/recipient set by first identifying a popularity, or number of recipients of a requested media item, and subsequently associating the media item with an advertisement (banner, window, video segment) expecting the established viewership. While conventional advertising seeks to divert the readers attention before their eyes are on the page, the system identifies and targets recipients after their eyes are on the page (or screen, window, etc.). Such an association allows an advertiser to specify, for example, to associate an ad (persuasive media item) with the most popular web page, or to run a commercial in a video stream only if at least a predetermined number of viewers are receiving the stream.

19 Claims, 7 Drawing Sheets

ONLINE ADVERTISEMENT PROVISIONING

BACKGROUND

Traditional advertising takes a generally indirect approach by displaying printed inducements alongside of other publications in anticipation of grabbing a reader's eye or catching a casual observer. Even more modern television advertising traditionally inserted commercial segments between aired programs in hopes of garnishing a viewer's attention over the fridge or the bathroom. Modern telecommunications, however, due in no small part to the Internet and digital transmission mediums, provides substantially more control over disseminated media, whether text, video, audio or a combination thereof. Digital transmission mediums coupled with ever-increasing transmission bandwidth allow both users to select, and providers to transmit, specific media content at a highly granular level.

Media sources, such as websites, cable TV providers, satellite TV, and Video on Demand (VoD) providers, to name several, allow recipients to select from a broad range of media content items (media items). Such a range of available content also provides additional opportunities for advertisers to inject promotional materials in conjunction with the requested media items. The nature and availability of digital selection also allows advertising media to be directed to specific websites or channels, thus allowing advertisers to qualitatively research and estimate a particular audience, and attempt to manipulate advertising media accordingly.

SUMMARY

Media delivery systems transport media content, such as streaming audio or video, to a rendering device proximate to a user. In a media delivery infrastructure, a plurality of users receive a multitude of media items on personal rendering devices via the Internet and other mediums, such as WiFi, WiMax, and WAP. Typical rendering devices include desktop computers, laptops, PDAs and personal audio and video devices such as an iPod® and related permutations. While often portable, such rendering devices may be fixed and/or integrated in other devices such as televisions. Therefore, such media items are renderable on a variety of computing devices.

A user often requests a media item via a browser for communicating with Internet web sites, or a dedicated service such as video on demand (VOD) through a cable TV/broadband provider. Conventional media providers often intersperse advertising in conjunction with requested media items such as web pages or movies. Advertising typically takes the form of a persuasive media item inserted in a concurrent window (as in a web page margin) or in sequence with a dedicated display as a commercial segment (as with a TV commercial or movie trailer). The persuasive media item seeks to influence the recipient to perform an action or selection, such as a retail purchase, visit a website, or download/watch a particular feature.

Conventional digital ad systems are typically designed to determine the best fit of a piece of content to a selected ad based on interpreting the context of the media and associating that context to a supply of potential advertisements. Such conventional contextual ad provisioning is employed in the Google® ad system and others. Online newspaper systems, for example, open a new opportunity for ad placement not just simply by selecting ad content based on the semantic context of the media—but rather by the behaviors of the consumer with that media. This includes being able to track and respond to popularity of articles as well as individual return visit behavior. Such online newspaper systems track a variety of behavioral metrics pertaining to the consumption of the content. Those metrics can in turn be used to provide a basis for ad selection, in much the same way that the conventional systems only refer to context matching.

While rendering of conventional advertising media is often a fee-based arrangement, conventional advertising suffers from the shortcoming that coupling between the advertising media and the target audience has not been strong or tightly related to the number of recipients actually receiving the ad. Traditional (e.g. print, TV) mechanisms have relied on ratings to estimate the audience of a given broadcast. More modern Internet-based approaches tie the fee for advertising to a subsequent invocation of the advertiser's website (e.g. the well known Google® pay-per-click) that charges the advertiser/website for each resulting visit from a banner or window display prompt. Configurations herein are based, in part, on the observation that conventional advertising, both print and electronic, is impression based—that is, influencing the recipient AFTER the user's eyes have caught the ad, banner, or front page. Conventional systems do not identify the number and/or quality of the recipients BEFORE transmitting a persuasive media item. Configurations herein substantially overcome the shortcoming of coupling persuasive media items (ads) with an established viewership/recipient set by first identifying a popularity, or number of recipients of a requested media item, and subsequently associating the media item with an advertisement (banner, window, video segment) expecting the established viewership. In other words, conventional advertising seeks to divert the readers attention before their eyes are on the page. In contrast, configurations herein identify and target recipients after their eyes are on the page (or screen, window, etc.). Thus, such an association allows an advertiser to specify, for example, to associate an ad (persuasive media item) with the most popular web page, or to run a commercial in a video stream only if at least 1000 viewers are receiving the stream. Associations can be fee structured such that advertisers pay for the association based on the popularity of the requested content item that their persuasive media item is associated with, and may be auction or demand based so that associations with high popularity command a premium.

Example ad sales categories based on popularity metrics may include:

Opportunity to advertise on the most popular article of the day

Opportunity to advertise with anyone who initially heads directly to the sports section Opportunity to advertise on the article that is most frequently emailed for a given day Opportunity to advertise to anyone who has read to the end of a given article These behavioral metrics can be built into an auction-based system, or they can be part of a contractual obligation based on the sale of an ad. For example, in an example auction the workflow may be as follows: John is willing to pay $4,000 to have his advertisement displayed in the most popular article of the day. What John didn't know is that even though $4,000 was enough to win him this bid last week, this week there is a circus in town and all of the bids are going up by 12% and that he will not win his placement this week for his typical $4,000.

Alternatively, the contractual model can work as such: John wishes to have his ad associated with the most popular article each day for 4 weeks. He contacts his ad sales representative and negotiates a price for his ad. Now, for the next 4 weeks, he is guaranteed placement on the most popular article regardless of content or competition. Such examples are illustrative and are intended to depict particular configurations of the provisioning system herein. In the example online ad provisioning system depicted, other mechanisms or algorithms may be used to replace the negotiated or auctioned component. The negotiated mechanism, for example, may look as follows: Where a popularity index (p) may be on scale of 1-10 (with 10 indicating highly popular), the amount paid (x) is in dollar form, and a price (c) has been set as the going rate of the highly popular articles, code may be written that resembles the following:

... within the layout algorithms of an article ...
   if p is greater than 9
      then fetch any ad where x is greater than c
... and insert the ad into the layout of the article ...

such an approach works for both negotiated and auctioned ads, the latter allowing for realtime adjustment and selection of 'winning' criteria.

Configurations discussed and claimed below disclose the manner of recognizing popularity as the impetus for advertising by providing the ability to introduce the variable p (popularity) into the equation. In order to do so, configurations herein provide a tight connection between the content publishing system (in the form of a content server) and the advertising system (taking the form of the ad placement server). Conventional systems do not provide sufficiently strong coupling.

In further detail, the method of directing placement of persuasive media (ads) as defined herein includes identifying, in a media delivery infrastructure for transmitting media items to a rendering device for user receipt, a popularity of a requested media item, in which the popularity is based on a number of users receiving the requested media item, such that the media items include the requested media items and the persuasive media items. An ad placement server associates, with the requested media item, a persuasive media item, in which the association is based on the popularity of the requested media item, and a personal rendering device (e.g. laptop, PDA, wireless phone, etc.) renders the persuasive media item associated with the requested media item in conjunction with the rendered requested media item.

The association defines a correlation between the popularity of the requested media item and a set of persuasive media items in an ad repository, such that each persuasive media item in the set of persuasive media items is designated for placement at a predetermined popularity. Popularity is based on a popularity metric indicative of the number of recipients currently receiving the requested media item on a rendering device. In the example arrangement, the popularity metric is defined by a popularity index, such that the popularity index corresponds to, for each persuasive media item, a popularity value, increment and compensation, in which the compensation denotes the cost of placing the persuasive media item at each respective increment of the popularity index. Associating the persuasive media item with a requested media item therefore includes determining, for a requested media item, the popularity index, scanning the popularity value of a set of the persuasive media items in the ad repository, and determining a corresponding persuasive media item to associate with the requested media item by comparing the popularity index with the scanned popularity values.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An example media delivery infrastructure provides media items to recipients, or users, for receiving requested media items. The requested media items may emanate from a variety of providers, such as remote websites, ISPs, cable television providers, fiber optic mediums, broadband providers, legacy (analog) television, and others. As is common in the field, service providers often deliver a variety of media through multiple different mediums. The disclosed configuration includes Internet connectivity, and may include wireless mediums appropriate to the rendering devices involved, such as WiFi, WiMax, and WAP. Further, the disclosed implementation of the popularity based associations are given as an example; other implementations for defining ad placement based on the popularity of requested media items may be apparent to those of skill in the art.

Figure 1:
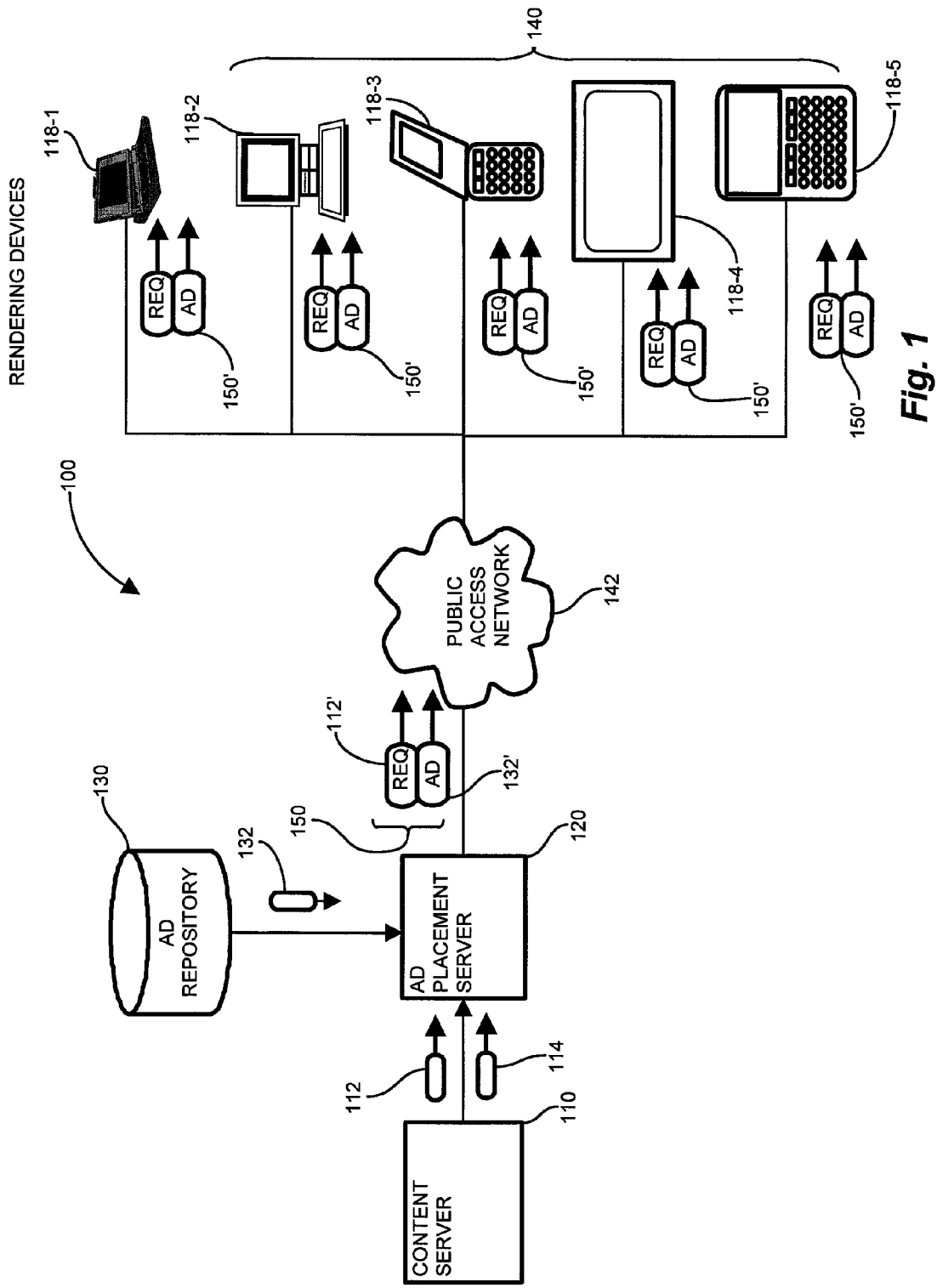
FIG. 1 is a context diagram of a media delivery infrastructure suitable for use with the present configuration.

FIG. 1 is a context diagram of a media delivery infrastructure suitable for use with the present configuration. Referring to FIG. 1, the media delivery infrastructure 100 includes a content server 110 for generating media content requested by a user (recipient). The media content takes the form of a requested media item 112, and may be delivered by any suitable mechanism, such as streaming audio/video, as a set of one or more packets, or as a fiber optic signal. The requested media item 112 also has a popularity 114 indicative of the recipients of the requested media item 112. An ad placement server 120 receives the requested media item 112 and popularity 114 for associating persuasive media items 132 with the requested media item 112. The popularity 114 may accompany the media content 112, or it may be determined by other mechanisms at the ad placement server 120, such as by a third party exchange with a statistical reference, for example. The ad placement server 120 identifies, based on the popularity 114, a persuasive media item 132 in an ad repository 130, typically an advertisement, for display in conjunction with the requested media item 112. The ad placement server 120 associates the identified persuasive media item 132 with the requested media item 112 for transmission and/or delivery to recipients 140.

Each of the recipients 140 has a rendering device 118-1 ... 118-5 (118 generally), such as a laptop PC 118-1, a desktop PC 118-2, a cellphone 118-3, a video monitor 118-4, or a personal audio/video device (i.e. iPod® or similar device) 118-5. It should be noted that other devices may be operable for rendering and that such personal electronic devices often overlap in multiple rendering capabilities. The requested media item 112 and associated persuasive media item 132 form an associated media item 150 including the requested and persuasive media items 112', 132', and the ad placement server 120 sends the associated media item 150 to the rendering devices 140 via the Internet 142 or other suitable means, such as cable TV or fiber optic line. Each rendering device 118 therefore receives the associated media item 150' including the requested media item 112 and the persuasive media item 132. It should be further noted that the associated media item 150' may include various arrangements of the requested media item 112 and the persuasive media item, such as multiple packets or streams of requested content associated with each persuasive media item 132, which may itself comprise multiple packets. The associated media item 150' therefore, defines the persuasive media item 132 associated with the requested media item 112 based on the popularity 114, discussed further below with respect to FIG. 3.

Figure 2:
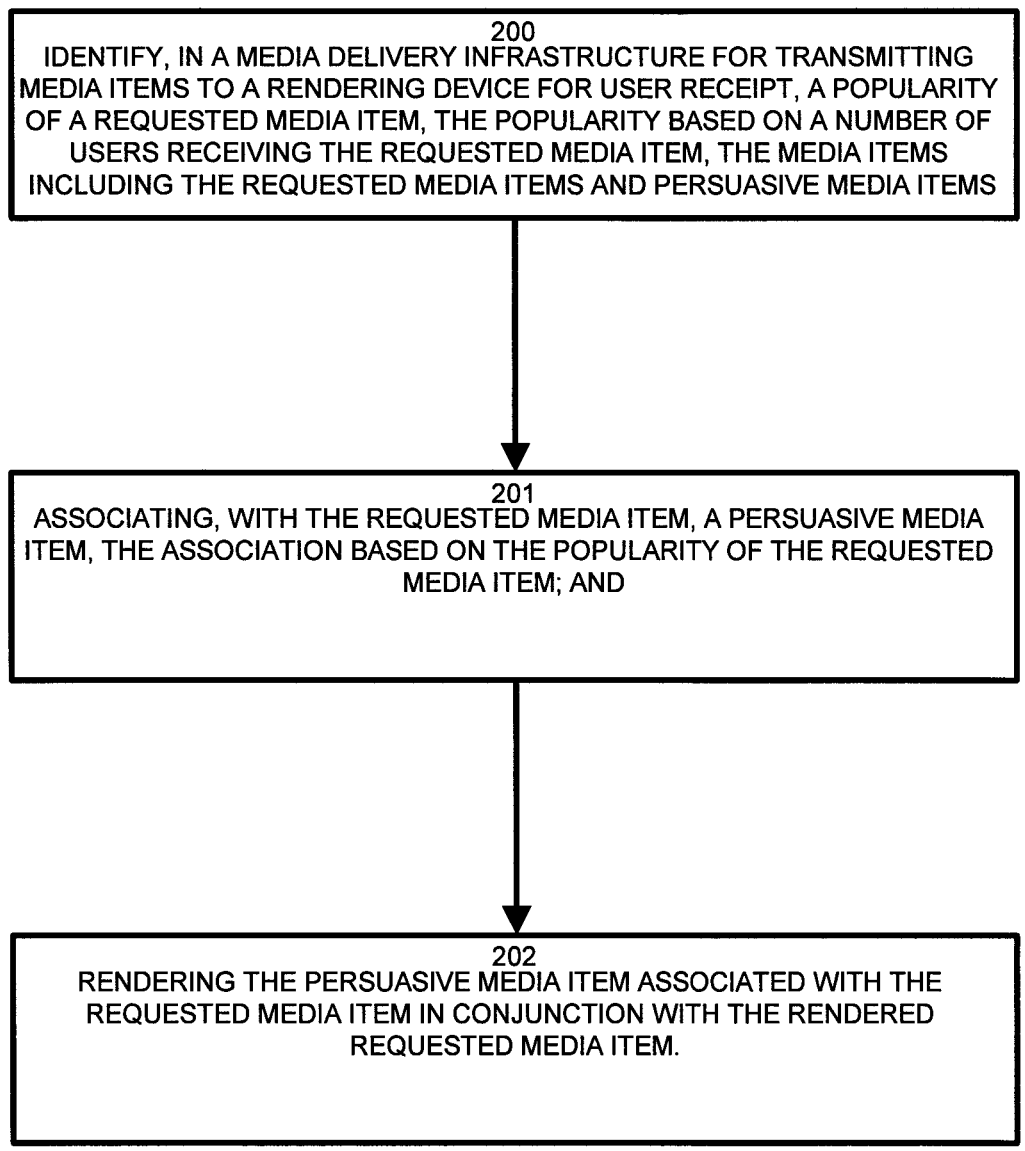
FIG. 2 is a flowchart of placement of a persuasive media item in the environment of FIG. 1.

FIG. 2 is a flowchart of placement of a persuasive media item in the environment of FIG. 1. Referring to FIGS. 1 and 2, the method of directing placement of persuasive media as defined herein includes, at step 200, identifying, in the media delivery infrastructure 100 for transmitting media items to a rendering device 118 for user receipt, a popularity 114 of a requested media item 112. The popularity 114 is based on a number of users receiving the requested media item 112, in which the deliverable, or transmittable, media items include both requested media items 112 and persuasive media items 132. Generally, the persuasive media items 132 are promotional content that accompanies the entertainment content, such that the entertainment content is primarily for viewer enjoyment and the promotional content for influencing an action or purchasing decision, such as a link or banner to a vendor's website.

The ad placement server 120 associates, with the requested media item 112, a persuasive media item 132, such that the association is based on the popularity 114 of the requested media item 112, as depicted at step 201. Such an association 160 (FIG. 3, below) may be made on a variety of compensatory arrangements, discussed further below. An ad repository 130 allows rendering of the persuasive media item 132 associated with the requested media item 112 in conjunction with the rendered requested media item 112, as shown at step 202.

The rendering may be made in a variety of ways appropriate to the medium. A web page may display the persuasive media item 132 as a banner and/or in the screen margins, while a TV medium may display the persuasive media item 132 as a sequential segment (i.e. commercial) between portions of the requested media item.

Figure 3:
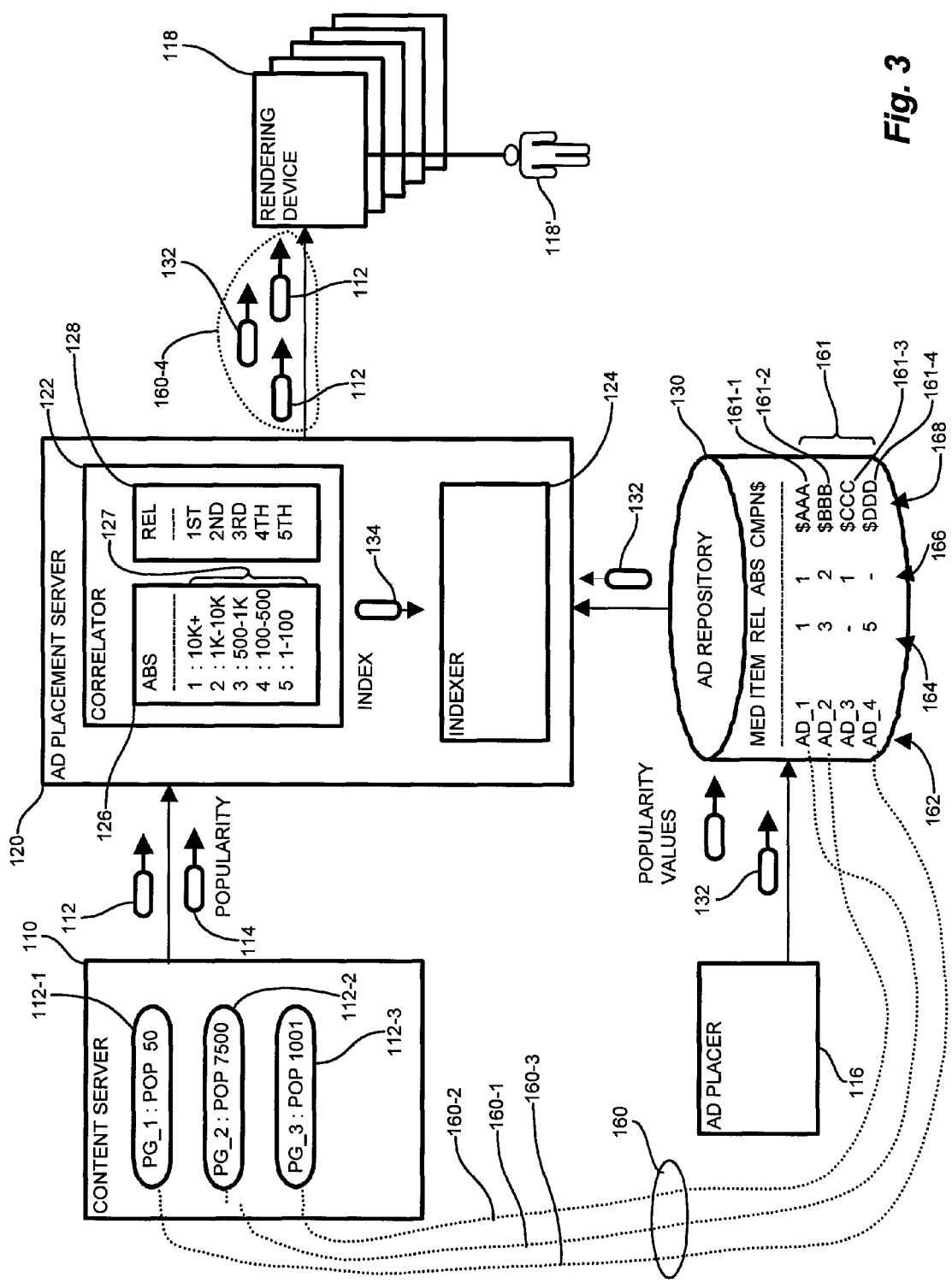
FIG. 3 is a block diagram of associating a persuasive media item as in FIG. 2.
Figure 4:
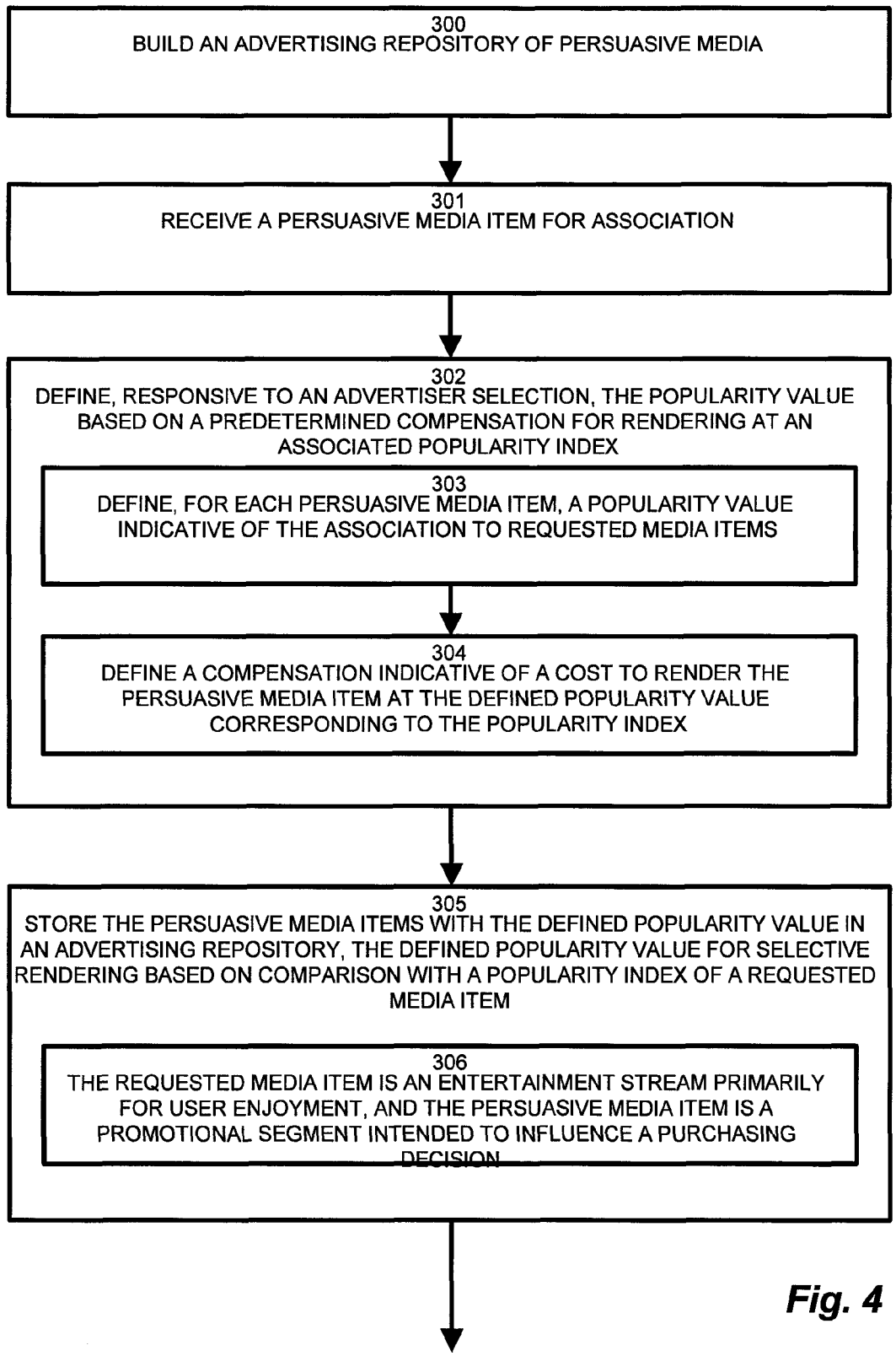
FIGS. 4-7 are a flowchart of associating a persuasive media item as in FIG. 3.
Figure 5:
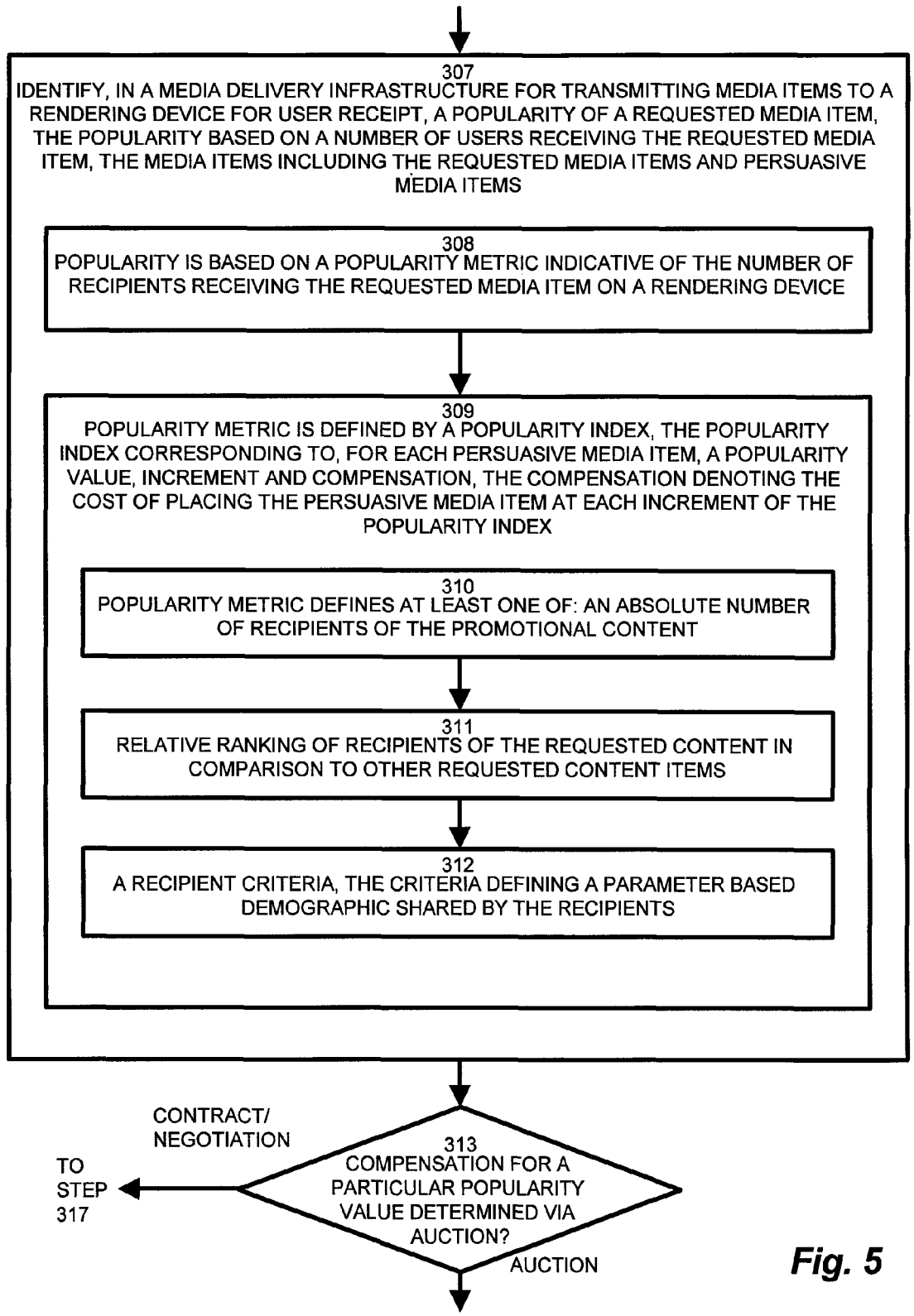
Figure 6:
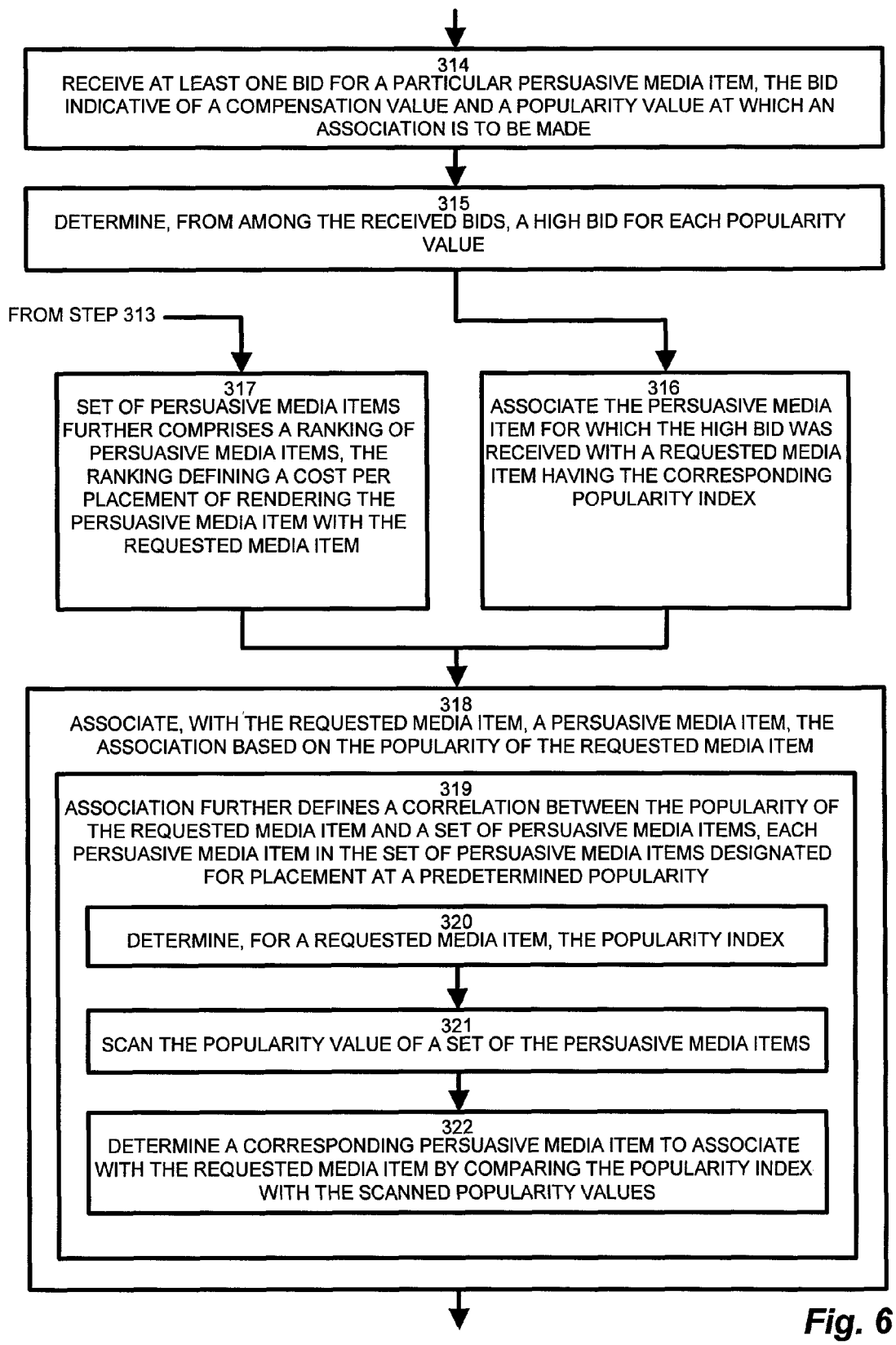
Figure 7:
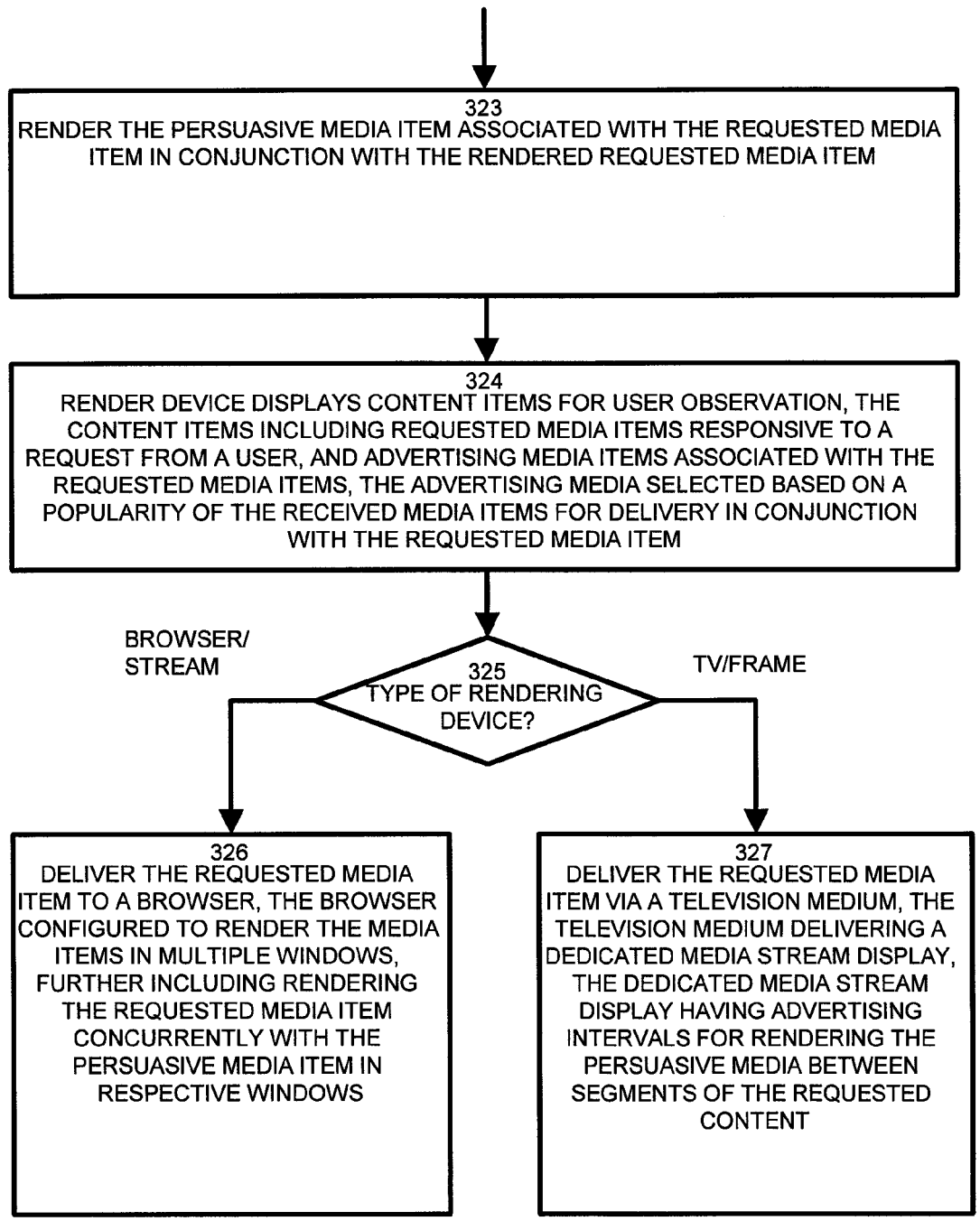

FIG. 3 is a block diagram of associating a persuasive media item 132 as in FIG. 2. Referring to FIGS. 1 and 3, a particular configuration for implementing the popularity 114 is shown. Alternate arrangements for defining the popularity 114 may be employed, such as varying increments (tiers) of the popularity index 134 and popularity values 164, 166, as well as varying compensation, such as various terms of a service level agreement (SLA) or quality of service (QOS) terms, all discussed further below. The ad placement server 120 includes a correlator module 122 and an indexer module 124. The correlator module 122 (correlator) maps the popularity 114 to a popularity index 134 used to define the associations 160. In the configuration shown, the popularity 114 is indicative of the raw number of recipients (rendering devices). An absolute popularity table 126 defines a popularity index 134 based on the range 127 of recipients 140 indicated. A relative popularity table 128 ranks the requested media items 112 according to the number of recipients. The correlator module 122 interprets the popularity 114 by mapping into the absolute popularity table 126 based on the range 127 and into the relative popularity table 128 by examining the popularity 114 values of the other requested content items 112.

An ad repository 130 includes entries 161-1 ... 161-4 (161 generally) of the stored persuasive media items 162 along with attribute values 164, 166 and 168. A relative value 164 corresponds to the relative popularity table 128. An absolute value 166 maps to the absolute popularity value 126. The compensation value 166 corresponds to the cost of the association, and may be driven by other factors, such as auctions, contracts (SLAs, QOS) and viewer demographics, for example. An ad placer 116 populates the ad repository 130 with the values 164, 166 responsive to the associations 160. The indexer module 124 (indexer) matches the relative popularity values 164 and absolute popularity values 166 to the popularity index 134 from the correlator module 122.

In the example shown, the content server delivers web pages PG__1, having popularity 50, PG__2, having popularity 7500, and PG__3 with popularity 1001. The correlator maps, for PG__1, a popularity index of 5 for absolute popularity of 50 and 3 for relative popularity. PG__2 receives an absolute popularity index of 2 for 7500 and a relative popularity index of 1. PG__3 ranks 2 in relative popularity and receives an absolute popularity index of 3 for a popularity of 1001. The resulting associations 160 of the stored persuasive media items 162 are, according to entry 161-1, AD__1 associates with requested media item PG__2 (112-2), shown as association 160-1. While 7500 does not satisfy the absolute first rank of 10K+, it is the highest relative priority. Read from the ad repository 130 values, an advertiser is willing to pay $AAA to associate (render) AD__1 with either the first relative or absolute requested media item.

Association 160-2 associates AD__2 with PG__3 (112-3), as a popularity (114) of 1001 meets the absolute popularity table 126 value of 2. AD__4 is associated with PG__1, as even though no absolute match (-) is indicated, a popularity of 50 meets the 3rd relative priority value 164 among requested media items 112-1 ... 112-3. Ad repository 130 entry 161-4 indicates that an advertiser is willing to pay $DDD for at least the 3rd most popular requested media item, regardless of viewership. No associations are made with AD__3, as the entry 161-3 indicates that an advertiser will pay $CCC, but only for a viewership exceeding 10K recipients (absolute popularity index of 1), shown in table 126, and no value is offered for a relative ranking (-).

The ad repository 130 sends the associated persuasive media items 132 to the ad placement server 120 for transmission to the rendering device 118. Association 160-4 further illustrates that the transmission structure of the request media items 112-1 . . . 112-3 and associated persuasive media items 132 need not have a parallel or similar structure or size, as often the persuasive media items are smaller and/or occupy fewer packets than the requested media items to which they correspond.

FIGS. 4-7 are a flowchart of associating a persuasive media item as in FIG. 3. Referring to FIGS. 3-7, prior to transmitting associated persuasive media items 132, the ad placer 116 builds an advertising repository 130 of persuasive media items 132, as depicted at step 300. The ad repository 130 receives a persuasive media item 132 (advertisement, banner, slogan, or other promotional media item) for association and subsequent rendering/displaying, as shown at step 201. The ad repository 130 defines, responsive to an advertiser selection, the popularity values 164, 166 based on a predetermined compensation 168 for rendering at an associated popularity index 134, as depicted at step 302. Associating further includes defining, for each persuasive media item 132 the popularity value in either the relative 164 or absolute 166 values indicative of the association to requested media items 112, as disclosed at step 303, and the compensation indicative of a cost to render the persuasive media item at the defined popularity value corresponding to the popularity index 134, as shown at step 304. Either or both values 164, 166 may be selected for matching with a popularity index 134 of a requested media item 112 for association and rendering with that item.

The ad repository 130 stores the entrees 161 defining the selected associations of the persuasive media items 162 with the defined popularity values 164, 166 in the advertising repository 130, such that the defined popularity values are for selective rendering based on comparison with the popularity index 134 of a requested media item 112, as depicted at step 305. The media delivery infrastructure 100 is configured for delivering persuasive 132 and requested 112 media items; the requested media item 112 is typically an entertainment stream or packet primarily for user enjoyment, and the persuasive media item 132 is a promotional segment intended to influence a purchasing decision, as depicted at step 306. Typically, the entertainment stream is actively sought by a user in response to a subscription and/or an on-demand or pay-per-view basis (i.e. as a fee-for-services-basis), and differs from the persuasive ad media which is promoted and paid for by ad sponsors.

The ad repository 130 represents an example arrangement of gathering and ordering potential persuasive media items 132 for subsequent provisioning and rendering with an appropriate requested media item 112. The method of directing placement of persuasive media further includes identifying, in the media delivery infrastructure for transmitting media items to a rendering device 118 for user 118' (recipient) receipt, a popularity of a requested media item, as depicted at step 307. The popularity 114 is based on a number of users 118' receiving the requested media item 112, in which the media items receivable via the infrastructure 100 include the requested media items 112 and persuasive media items 132. In the example arrangement shown, the popularity 114 is based on a popularity metric indicative of the number of recipients 118' receiving the requested media item 112 on a rendering device 118, as shown at step 308. The popularity may, in alternate arrangements, represent other quantums of recipients and may also specify qualitative demographics about the recipients, such as the genre or channel of the requested media item 112.

The popularity metric is defined by a popularity index 134, in which the popularity index 134 corresponds to, for each persuasive media item 132, a popularity value 164, 166, increment and compensation 168, as depicted at step 309. The increment indicates the tier, or level of the absolute and relative popularity values 164, 166, and the compensation 168 denotes the cost of placing the persuasive media item 132 at each increment of the popularity index 134. In the example arrangement, the popularity metric defines either an absolute number of recipients of the promotional content, as shown at step 310, a relative ranking of recipients of the requested content in comparison to other requested content items, as depicted at step 311, or a recipient criteria, in which the recipient criteria defines a parameter based demographic shared by the recipients, as depicted at step 312. The popularity index 134 computed by the correlator module 122 is mappable into the ad repository 130 for comparison and matching with the relative popularity value 164 and absolute popularity value 166.

Compensation 168 for persuasive media item 162 association from the repository 130 is established in any suitable manner, such as contract, service level agreement (SLA), quality of service (QOS), and auction, for example. If, at step 313, compensation for a particular popularity value 164, 166 and corresponding entry 161 is determined via auction, then the ad placement server 120 or other auction server receives at least one bid for a particular persuasive media item 132, such that the bid is indicative of a compensation value 168 and a popularity value 164, 166 at which an association 160 is to be made, as disclosed at step 314. The ad placement server 120 determines, from among the received bids, a high bid for each popularity value 164, 166, as depicted at step 315, and associates the persuasive media item 132 for which the high bid was received with a requested media item 112 having the corresponding popularity index 134, as shown at step 316. An entry 161 then stores the persuasive media item 162 with the values 164, 166 and compensation 168 in the ad repository 130. It should be noted that the ad repository 130 may be updated in an ongoing manner with the ad placement server 120 defining associations for currently rendered requested media items 112; the sequential nature presented is illustrative.

If no auction defines the entries 161, the set of persuasive media items 162 comprises a ranking of persuasive media items 132, in which the ranking defines a cost per placement of rendering the persuasive media item 162 from the repository 130 with the requested media item 112, as shown at step 317.

Using the set of entries 161 established in the ad repository 130 or otherwise available, the correlator module 122 associates, with the requested media item 112, a persuasive media item 132, in which the association is based on the popularity of the requested media item 112, as depicted at step 318. In the example arrangement, the association further defines a correlation between the popularity 114 of the requested media item 112 and a set of persuasive media items 130, in which each persuasive media item 162 in the set of persuasive media items 130 is designated for placement at a predetermined popularity defined in the value fields 164, 166, as shown at step 319. The correlator module 122 thus determines, for a requested media item 112, the popularity index 134 for either or both of the absolute 126 and relative 128 tables, as disclosed at step 320, and the indexer module 124 scans the popularity values 164, 166 of the set of the persuasive media items 130 (ad repository), as depicted at step 321. The indexer module 124 determines a corresponding persuasive media item 162 to associate with the requested media item 112 by comparing the popularity index 134 with the scanned popularity values 164, 166, as depicted at step 322.

The ad placement server 120 renders the persuasive media item 132 associated with the requested media item 112 in conjunction with the rendered requested media items 112-1 . . . 112-3, as disclosed at step 323. Following transmission from the ad placement server 120, a local rendering device 118 displays the transmitted media for user observation, in which the media items including requested media items 112 responsive to the request from a user 118', and the persuasive (advertising) media items 132 associated with the requested media items 112. As indicated above, the persuasive (advertising) media 162 is selected based on the popularity 114 of the requested media items 112 for delivery in conjunction with the requested media items 112, as disclosed at step 324.

A check is performed, at step 325, to identify the type of rendering device. Based on the rendering device 118, transmission and rendering may be different, such as whether sequential or concurrent display of the media items 112, 132 is most appropriate. If the rendering device supports browser operations, then rendering the requested media item 112 further includes delivering the requested media item 112 to a browser, in which the browser is configured to render the media items in multiple windows, and rendering the requested media item 112 concurrently with the persuasive media item 132 in respective windows, as depicted at step 326. In contrast, if the rendering device is a TV, as in the case of a cable provider, then rendering the requested media item 112 includes delivering the requested media item 112 via a television medium, in which the television medium delivers a dedicated media stream display, such that the dedicated media stream display has advertising intervals for rendering the persuasive media items 132 between segments of the requested media items 112.

Alternate rendering formats may be likewise applicable for other rendering devices. For example, the techniques described herein may be implemented by various components of a computer system configured to provide the functionality described. As discussed above with respect to FIG. 3, the block diagram illustrates one embodiment of an ad placement server 120 and connected components configured to implement the methods described herein. In different embodiments, the environment 100 may include any of various types of devices, including but not limited to a personal computer (PC), desktop computer, laptop, notebook or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device.

Those skilled in the art should readily appreciate that the programs and methods for online ad provisioning as defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a set of software executable objects or modules, or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for online ad provisioning has been particularly shown and described with references to embodiments thereof, it will be understood by those skilled in the art that various changes in form and details may be made therein without departing from the scope of the invention encompassed by the appended claims.

What is claimed is:

1. A method comprising:
   determining, by a processor, a popularity metric describing a current download rate of a requested media item in real time;
   identifying, by the processor, from transmitted media items, a popularity of the requested media item, the popularity based on the popularity metric indicating a number of recipients currently receiving the requested media item in real time, the media items including a plurality of requested media items and persuasive media items;
   associating, by the processor, with the requested media item, a persuasive media item, the association based on the popularity of the requested media item; and
   transmitting, by the processor, the persuasive media item associated with the requested media item in conjunction with the requested media item.

2. The method of claim 1 wherein the association further defines, in a media delivery infrastructure for transmitting the media items to a rendering device, a correlation between the popularity of the requested media item and a set of persuasive media items, each persuasive media item in the set of persuasive media items designated for placement at a predetermined popularity.

3. The method of claim 2 wherein the set of persuasive media items further comprises a ranking of persuasive media items, the ranking defining a cost per placement of rendering the persuasive media item with the requested media item.

4. The method of claim 1, wherein the popularity metric is defined by a popularity index, the popularity index corresponding to, for each persuasive media item, a popularity value, increment and compensation, the compensation denoting a cost of placing the persuasive media item at each increment of the popularity index.

5. The method of claim 4 wherein associating further comprises:
   determining, for a requested media item, the popularity index;
   scanning respective popularity values for each persuasive media item of a set of persuasive media items; and
   determining a corresponding persuasive media item to associate with the requested media item by comparing the popularity index with the respective popularity values.

6. The method of claim 5, further comprising delivering, by the processor the requested media item to a browser, the browser configured to render the media items in multiple windows, further including rendering the requested media item concurrently with the persuasive media item in respective windows.

7. The method of claim 5 wherein rendering the requested media item further comprises delivering the requested media item via a streaming medium, the streaming medium delivering a dedicated sequential media stream display, the dedicated sequential media stream display having advertising intervals for rendering the persuasive media item between segments of the requested media item.

8. The method of claim 2 wherein associating further comprises defining, for each persuasive media item:
   a defined popularity value indicative of the association to requested media items; and
   a compensation indicative of a cost to render the persuasive media item at the defined popularity value corresponding to a popularity index.

9. The method of claim 8 further comprising building, by the processor an advertising repository of persuasive media items by:
   receiving a plurality of persuasive media items for association;
   defining, responsive to an advertiser selection, respective popularity values for the plurality of persuasive media items based on a predetermined compensation for rendering at an associated popularity index; and
   storing the plurality of persuasive media items with the respective popularity values in an advertising repository, each of the respective popularity values for selective rendering based on comparison with the popularity index of a requested media item.

10. The method of claim 9 wherein the compensation for a particular popularity value is determined via auction, further comprising:
   receiving a plurality of bids for a particular persuasive media item, each of the plurality of bids indicative of a compensation value and a respective popularity value at which an association is to be made;
   determining, from among the plurality of bids, a high bid for each respective popularity value; and
   associating the persuasive media item for which the high bid was received with a requested media item having a corresponding popularity index.

11. The method of claim 4 wherein the popularity metric defines at least one of:
   an advertising media absolute number of recipients of the requested media item;
   a relative ranking of recipients of the requested media item in comparison to other requested media items; or
   a recipient criteria, the recipient criteria defining a parameter based demographic shared by the recipients.

12. An apparatus comprising:
   a processor in communication with a memory configured to store instructions, the processor configured to execute the instructions comprising an application for directing placement of one or more advertising media, the application comprising:
      a correlator module configured for:
         determining a popularity metric describing a current download rate of a requested media item in real time;
         identifying, in a media delivery infrastructure for rendering media items, a popularity of the requested media item rendered on a rendering device, the popularity based on the popularity metric indicating a number of recipients currently receiving the requested media item in real time,
      an indexer module configured for associating, based on the popularity identified by the correlator module, a second media item, the second media item placed on behalf of a promoting entity with an expectation of consumer behavior; and
   an interface to a communications network configured for transmitting the second media item based on the popularity identified by the correlator module meeting the expectation.

13. The apparatus of claim 12 wherein the requested media item is an entertainment stream, and the second media item is a promotional segment intended to influence a purchasing decision.

14. The apparatus of claim 13 wherein the interface is further configured for transmitting the media items, the media items including requested media items responsive to a request, and advertising media items associated with the requested media items, the one or more advertising media selected based on a popularity of the requested media items for delivery in conjunction with the requested media item.

15. The apparatus of claim 14 wherein the rendered media items comprise requested media item and persuasive media items including an advertising media resulting from a fee-for services arrangement.

16. The apparatus of claim 15 wherein the popularity metric is defined by a popularity index, the popularity index corresponding to, for each persuasive media item, a popularity value, increment and compensation, the compensation denoting a cost of placing the persuasive media item at each increment of the popularity index.

17. The apparatus of claim 16 wherein the popularity metric defines at least one of:
   an absolute number of recipients of the media item;
   a relative ranking of recipients of the requested media in comparison to other requested media items; or
   a recipient criteria, the recipient criteria defining a parameter based demographic shared by the recipients.

18. The apparatus of claim 17 wherein the correlator module is further configured for:
   determining, for a requested media item, the popularity index;
   scanning respective popularity values for each persuasive media item of a set of persuasive media items; and
   determining a corresponding persuasive media item to associate with the requested media item by comparing the popularity index with the respective popularity values.

19. A computer program on a non-transitory computer readable storage medium encoded as a set of processor based instructions that, upon execution by a processor, cause the processor to perform a method comprising:
   determining a popularity metric describing a current download rate of a received media item in real time;
   identifying, in a media delivery infrastructure for transmitting media to a rendering device, a popularity of the received media item, the popularity based on the popularity metric indicating a number of recipients currently receiving the received media item;
   associating, with the received media item, one or more advertising media items, the association based on the popularity of the received media item; and
   transmitting the one or more advertising media items associated with the received media item.

* * * * *